(12) United States Patent
Spanhake

(10) Patent No.: US 8,503,943 B2
(45) Date of Patent: Aug. 6, 2013

(54) WIRELESS SENSORS AND APPLICATIONS

(75) Inventor: Shannon Spanhake, Prattsville, NY (US)

(73) Assignee: The Regents of the University of California, Oakland, CA (US)

( * ) Notice: Subject to any disclaimer, the term of this patent is extended or adjusted under 35 U.S.C. 154(b) by 506 days.

(21) Appl. No.: 12/881,122

(22) Filed: Sep. 13, 2010

(65) Prior Publication Data

US 2011/0092164 A1 Apr. 21, 2011

Related U.S. Application Data

(63) Continuation-in-part of application No. PCT/US2009/036832, filed on Mar. 11, 2009.

(60) Provisional application No. 61/035,670, filed on Mar. 11, 2008.

(51) Int. Cl.
*H04B 17/00* (2006.01)

(52) U.S. Cl.
USPC ............. 455/67.11; 455/423; 455/115.1; 455/226.1; 340/636.1

(58) Field of Classification Search
USPC ........... 455/67.11, 423, 115.1, 226.1, 13.4, 455/522, 574, 127.1, 127.5, 343.5; 340/516, 340/506, 515, 636.1, 531, 438
See application file for complete search history.

(56) References Cited

U.S. PATENT DOCUMENTS

| | | | | |
|---|---|---|---|---|
| 5,686,885 A | * | 11/1997 | Bergman | 340/514 |
| 5,686,896 A | * | 11/1997 | Bergman | 340/636.1 |
| 6,285,955 B1 | * | 9/2001 | Goldwasser | 702/6 |
| 7,128,270 B2 | * | 10/2006 | Silverbrook et al. | 235/472.01 |
| 7,382,238 B2 | * | 6/2008 | Kavaler | 340/438 |
| 7,426,190 B2 | * | 9/2008 | Manjeshwar et al. | 370/254 |
| 8,089,827 B2 | * | 1/2012 | Carotenuto | 367/128 |
| 8,111,156 B2 | * | 2/2012 | Song et al. | 340/541 |
| 8,144,034 B2 | * | 3/2012 | Kavaler | 340/941 |
| 8,312,768 B2 | * | 11/2012 | Duran Neira et al. | 73/170.29 |
| 2007/0175268 A1 | * | 8/2007 | Honda | 73/35.04 |
| 2011/0009019 A1 | * | 1/2011 | Neira et al. | 441/1 |
| 2011/0248846 A1 | * | 10/2011 | Belov et al. | 340/539.1 |
| 2011/0298301 A1 | * | 12/2011 | Wong et al. | 307/116 |
| 2012/0271577 A1 | * | 10/2012 | Yunzhong | 702/63 |
| 2013/0064178 A1 | * | 3/2013 | Cs et al. | 370/328 |

\* cited by examiner

*Primary Examiner* — Minh D Dao
(74) *Attorney, Agent, or Firm* — Perkins Coie LLP

(57) ABSTRACT

Techniques, apparatuses, and systems can include operating a sensor to respond to one or more target environmental inputs to produce sensor data, sampling the sensor data to produce sample values, performing a sample comparison among two or more of the sample values, monitoring a power supply to ascertain a power level; and selectively transmitting measurement data to a server via one or more wireless communication channels based on the power level and the sample comparison, where the measurement data includes one or more of the sample values.

23 Claims, 12 Drawing Sheets

WIRELESS SENSORS AND APPLICATIONS

PRIORITY CLAIM

This document is a continuation-in-part under 35 U.S.C. 120 of International Patent Application No. PCT/US2009/036832, filed Mar. 11, 2009, which claims benefit of U.S. Provisional Application No. 61/035,670, filed on Mar. 11, 2008, entitled "WIRELESS SENSORS AND APPLICATIONS," both of which are incorporated by reference as part of the disclosure of this document.

BACKGROUND

This application relates to wireless sensors.

A sensor can measure one or more different environmental inputs, such as parameters or substances, e.g., gases or liquids. For example, a sensor can be used to measure gas levels. Examples of environmental parameters include temperature, vibration, humidity, barometric pressure, radiation level, and light intensity. A gas sensor can measure one or more specific gases, such as carbon monoxide, nitrogen oxide, sulfur dioxide, or ozone. In some implementations, a sensor can include one or more sensing heads with different sensing materials to detect different substances or different parameters at the locale of the sensor.

SUMMARY

This application describes, among others, techniques, apparatuses, and systems that provide intelligent wireless sensors to detect and/or monitor targeted substances or parameters and to transmit, store, and/or supply sensor measurement data for various applications.

Techniques, apparatuses, and systems can include operating a sensor to respond to one or more target environmental inputs to produce sensor data, sampling the sensor data to produce sample values, performing a sample comparison among two or more of the sample values, monitoring a power supply to ascertain a power level; and selectively transmitting measurement data to a server via one or more wireless communication channels based on the power level and the sample comparison, where the measurement data includes one or more of the sample values.

These and other implementations can include one or more of the following features. Selectively transmitting measurement data can include determining whether to transmit based on a comparison between the power level and a power level threshold value. Selectively transmitting measurement data can include overriding the determination to transmit measurement data based on a comparison between the sample comparison and a reporting threshold value. Another feature includes selectively adjusting a sampling frequency based on the sample comparison. Sampling the sensor to produce sample values can include sampling data from the sensor at the sampling frequency. Selectively adjusting the sampling frequency can include increasing the sampling frequency based on the sample comparison. Performing the sample comparison can include computing a percent change between a current sample value and a previous sample value from the sensor. Selectively transmitting measurement data can include transmitting the measurement data to a wireless device over a first wireless channel. The wireless device can forward the measurement data to a server over a second wireless channel Transmitting the measurement data to the wireless device can include transmitting the measurement data over a Bluetooth communication channel. Selectively transmitting measurement data can include transmitting the measurement data to the server via a broadband wireless network.

Techniques, apparatuses, and systems for using wireless sensors in a wireless communication network can include operating a sensor to respond to one or more target substances to produce a measurement; operating a power control unit that is electrically coupled to the sensor to supply and regulate electrical power to the sensor; measuring a change of measurement data coming out of the sensor in comparison to prior measurement data coming out of the sensor; controlling the sensor to adjust a sampling rate of the sensor based on the measured change of incoming measurement data in comparison to the prior measurement data; and operating a wireless transmitter to wirelessly transmit measurement data to a wireless receiver. Operating a wireless transmitter can include operating a Bluetooth transmitter.

Techniques, apparatuses, and systems for distributed sensor management can include obtaining data related to a target environmental input, operating a wireless device to detect a surrounding wireless device, determining whether the surrounding wireless device is configured to obtain data related to the target environmental input, coordinating with the surrounding wireless device to obtain measurement data at time intervals different from the surrounding wireless device's time intervals; and communicating the measurement data to a server. The server can collate the communicated measurement data with measurement data from the surrounding wireless device.

These and other implementations can include one or more of the following features. Operating the wireless device to detect the surrounding wireless device can include searching for wireless devices communicating in an ad-hoc network. Operating the wireless device to detect the surrounding wireless device can include searching for wireless devices on a Bluetooth communication channel. Each of the wireless devices can include a sensor that responds to the target environmental input. Each of the wireless devices can wirelessly communicate with a wireless sensor module to obtain measurement data. The wireless sensor module can include a sensor that responds to the target environmental input.

Apparatuses can include a sensor to respond to one or more target environmental inputs to produce sensor data; a power control unit electrically coupled to the sensor to supply and regulate electrical power to the sensor; a controller in communication with and to control operations of the sensor and the power control unit, where the controller is configured to sample the sensor data to produce sample values, perform a sample comparison among two or more of the sample values, monitor the power control unit to ascertain a power level, and selectively control a transmission of measurement data based on the power level and the sample comparison, where the measurement data includes one or more of the sample values; and a wireless transmitter in communication with the controller to wirelessly transmit the measurement data to a server in response to an output of the controller. The server can be configured to collect sensor data.

These and other implementations can include one or more of the following features. The wireless transmitter can communicate with the server via a broadband wireless network. The wireless transmitter can communicate with a wireless device via a short range radio protocol such as Bluetooth. The wireless device can forward the measurement data to the server via the broadband wireless network. The controller can include a sensor microcontroller, the sensor microcontroller configured to include at least one internal memory unit to store the sample values, the sensor microcontroller configured to control the sensor and to adjust a sampling frequency of the sensor based on the sample comparison. The apparatus can include a portable power source connected to the power control unit which directs electrical power from the portable power source to the sensor and regulates the electrical power in response to a control by the sensor microcontroller. The portable power source can include a battery. The wireless transmitter can wirelessly communicate with a wireless digital communication device which wirelessly communicates with a wireless network so that the measurement data is first wirelessly transferred to the wireless digital communication device which in turn wirelessly transfers the measurement data to the wireless network. The wireless digital communication device can be a mobile phone. The wireless transmitter can directly wirelessly communicate with a wireless network to wirelessly transfer the measurement data to the wireless network. The controller can include a wireless chip set configured to directly wirelessly communicate with a base station of a wireless network. The wireless chip set can include an integrated sensor controller in communication with and to control operations of the sensor and the power control unit. In some implementations, the wireless transmitter is part of a wireless transceiver in communication with and under control of the wireless chip set to wirelessly communicate with the wireless network and to transfer the measurement data from the sensor to the wireless network. Selectively controlling a transmission of measurement data can include determining whether to transmit based on a comparison between the power level and a power level threshold value. Selectively controlling a transmission of measurement data can include overriding the determination, based on a comparison between the sample comparison and a reporting threshold value, to transmit the measurement data. The controller can selectively adjust a sampling frequency based on the sample comparison. Sampling the sensor to produce sample values can include sampling data from the sensor at the sampling frequency. Selectively adjusting the sampling frequency can include increasing the sampling frequency in response to the detected change. Performing the sample comparison can include computing a percent change between a current sample value and a previous sample value from the sensor.

Systems can include a server configured to receive sensor data; and a sensor module in communication with the server configured to operate a sensor to respond to one or more target environmental inputs to produce sensor data, sample the sensor data to produce sample values, perform a sample comparison among two or more of the sample values, monitoring a power supply to ascertain a power level, and selectively transmit measurement data to a server via one or more wireless communication channels based on the power level and the sample comparison, where the measurement data includes one or more of the sample values.

These and other implementations can include one or more of the following features. The system can include a wireless device that includes a first transceiver to wirelessly communicate with the sensor module to receive the measurement data and a second transceiver to wirelessly communicate with a wireless network to transfer the measurement data to the server. The system can include a wireless device in communication with the server via a broadband wireless network, where the sensor module is integrated into the wireless device. Selectively transmitting measurement data can include determining whether to transmit based on a comparison between the power level and a power level threshold value. Selectively transmitting measurement data can include overriding the determination, based on a comparison between the sample comparison and a reporting threshold value, to transmit the measurement data. The sensor module can selectively adjust a sampling frequency based on the sample comparison. Sampling the sensor to produce sample values can include sampling data from the sensor at the sampling frequency. Selectively adjusting the sampling frequency can include increasing the sampling frequency in response to the detected change. Performing the sample comparison can include computing a percent change between a current value and a previous value from the sensor. The system can include an application server configured to receive the measurement data and to provide information based on the measurement data. The system can include an additional sensor module configured to produce additional measurement data. The server can aggregate data from multiple sensor modules.

Particular implementations of the subject matter described herein can be implemented to realize one or more of the following potential advantages. Selectively transmitting measurement data can decrease energy usage and therefore extend the energy output of a power supply. Dynamically adjusting a sampling frequency as described herein can extend the energy output of a power supply. Selectively transmitting measurement data can also extend the power supply. Techniques herein can enable a sensor module that includes multiple sensors to generate data efficiently to extend the energy output of a power supply. Other advantages include enabling ad-hoc socio-physical networking, horizontal sharing of data, aggregating data for privacy, and pattern recognition to reduce noise.

The details of multiple implementations are set forth in the accompanying drawings, the description and the claims.

BRIEF DESCRIPTION OF THE DRAWINGS

Like reference symbols in the various drawings indicate like elements.

DETAILED DESCRIPTION

Figure 1A:
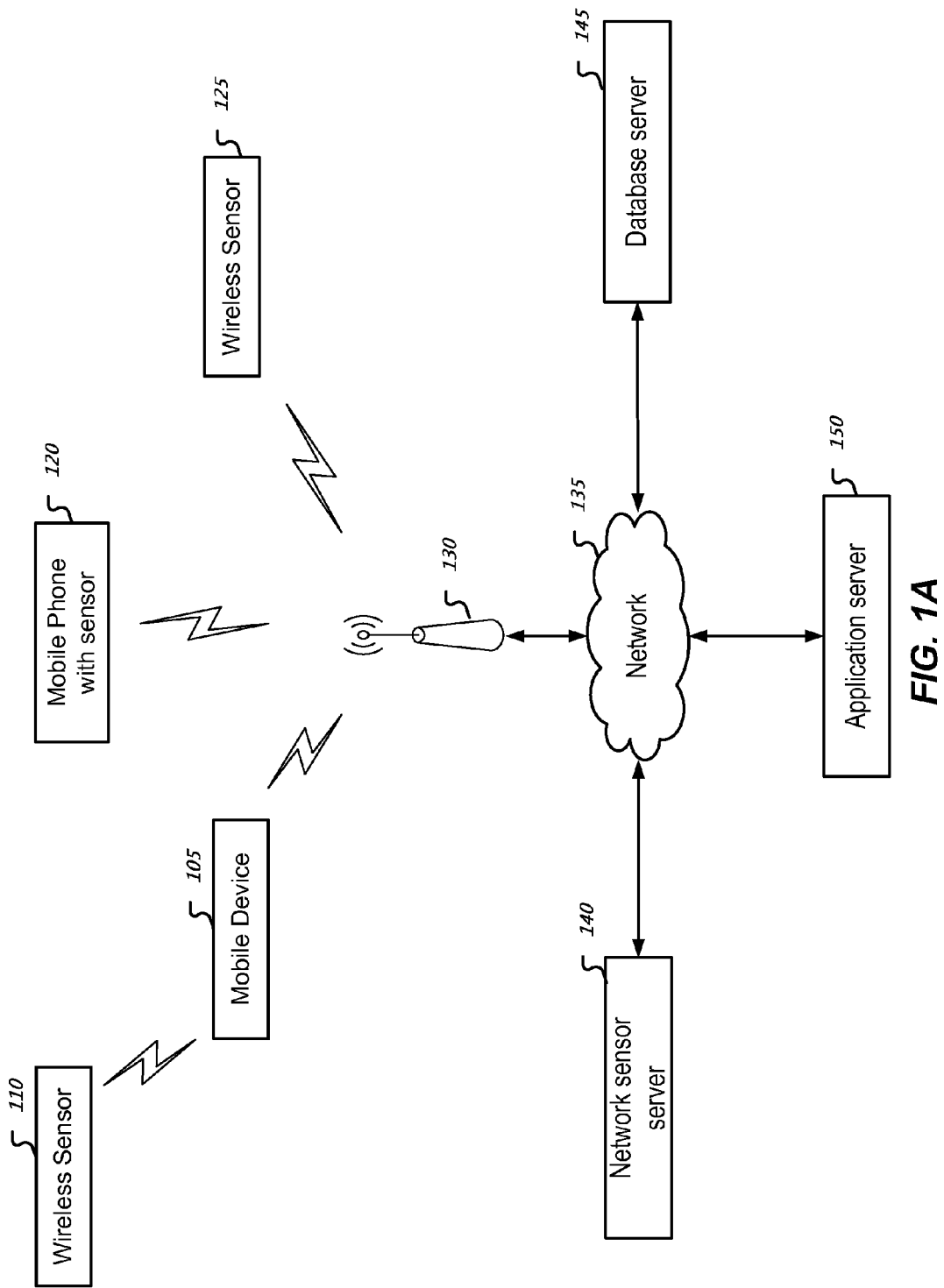
FIG. 1A shows an example of a wireless sensor system architecture.

A sensor module can include one or more sensors to monitor different environmental conditions or substances, such as gases or liquids. A sensor module can power and activate a sensor to collect sensor measurement data. The sensor module can communicate sensor data to a server for processing and/or storage. A sensor module can include a gas sensor that measures one or more specific gases such as carbon monoxide, nitrogen oxide, sulfur dioxide, or ozone. For example, a sensor module can include an off-the-shelf CO and/or $NO_2$ gas sensor, such as an automotive sensor Model No. MiCS-4514 marketed by MicroChemical Systems, Switzerland. In some implementations, a sensor can detect a parameter for a property of the locale of the sensor, such as temperature, vibration, humidity, barometric pressure, radiation level, light intensity and others. A sensor module can include multiple sensors. For example, a sensor module can include a first sensor for detecting one or more substances and a second sensor for detecting temperature. In some implementations, a sensor module can include multiple sensors such as a CO or $NO_2$ gas sensor and a humidity sensor, where the humidity sensor can be used to account for the negative effect humidity has on monitoring CO and $NO_2$. Data from both sensors can be transmitted and stored, and also can be used to calculate gas sensor performance.

Sensor data can be transmitted to a server and can be stored in the server or an associated data storage device. Applications can use sensor data for one or more purposes, e.g., generating safety warnings, such as indicating a dangerous level of a specific gas, providing sensor data analysis, or providing historical sensor data. In some implementations, a sensor module can send measurement data to a server via one or more wireless communication channels, communication networks, and/or one or more wireless devices, such as a mobile device, a mobile phone, or a wireless computing device. For example, the sensor module can wirelessly communicate with a wireless device over a wireless channel using a short range radio protocol, such as Bluetooth, and the wireless device, in turn, can communicate with the server using a different wireless channel in a broadband wireless network, such as CDMA2000 1x, EV-DO, Zigbee, UMB, GSM, WCDMA, HSPA (High-Speed Packet Access), LTE, WiMAX, or WiFi. A network such as the Internet can be used to forward data between a wireless network and a server. In some implementations, a wireless device and a sensor module can be integrated into a single device. For example, a mobile phone can include an integrated chip to control both wireless communication and sensor functions. In another example, a sensor module can include a transceiver that wirelessly communicates over a broadband wireless network.

A sensor module can optimize power consumption by utilizing one or more techniques, such as selectively transmitting sensor data or dynamically adjusting a sampling frequency associated with a sensor. For example, a sensor module can modulate a sample frequency of one or more off-the-shelf sensors by calculating the percentage of change between previous and current sample readings. In implementations with a limited power supply, a sensor module can perform passive sampling on the sensor, as instructed by a controller of the sensor, to consume less power and then switch to active sampling when sensor data is interesting or exceeds a reporting threshold value. For example, a sensor module can decrease a sample frequency to extend battery life when there is minor or no variations in sample readings. However, if there is a gas leak, the sensor module can detect this through an increase in the value of readings from a gas sensor and, in turn, can increase the frequency of obtaining samples.

A sensor module can modulate the storage and transmission of sensor data based on a power level. If power is limited, then the sensor module can store and synchronize data until a power supply increases, e.g., a battery is recharged. However, if power is limited and the sensor data is deemed interesting or exceeds a reporting threshold value, the sensor module can transmit the sensor data. In some implementations, the frequency of storage and transmission can be determined with respect to the value of the sensor data and the percentage of change between samples. Further, multiple sensor modules and/or wireless devices can perform distributed sampling. Distributed sampling can include different devices within a specific area taking samples over different time intervals. In some implementations, a sensor module can communicate with different wireless devices to reduce the overall processing and transmission load when compared with using one wireless device.

In some implementations, a wireless device can detect one or more surrounding wireless devices. For example, a wireless device can scan an ad-hoc wireless network or Bluetooth communication channel(s) to search for other devices. The wireless device can determine whether a surrounding wireless device is configured to obtain similar sensor data, e.g., configuration data can be exchanged between devices or provided by a server. If so configured, the devices can coordinate to sample a target environmental input in a distributed fashion, e.g., each device taking turns on obtaining measurement data. These devices can forward measurement data to a server, where the server can collate measurement data from different devices.

Figure 5:
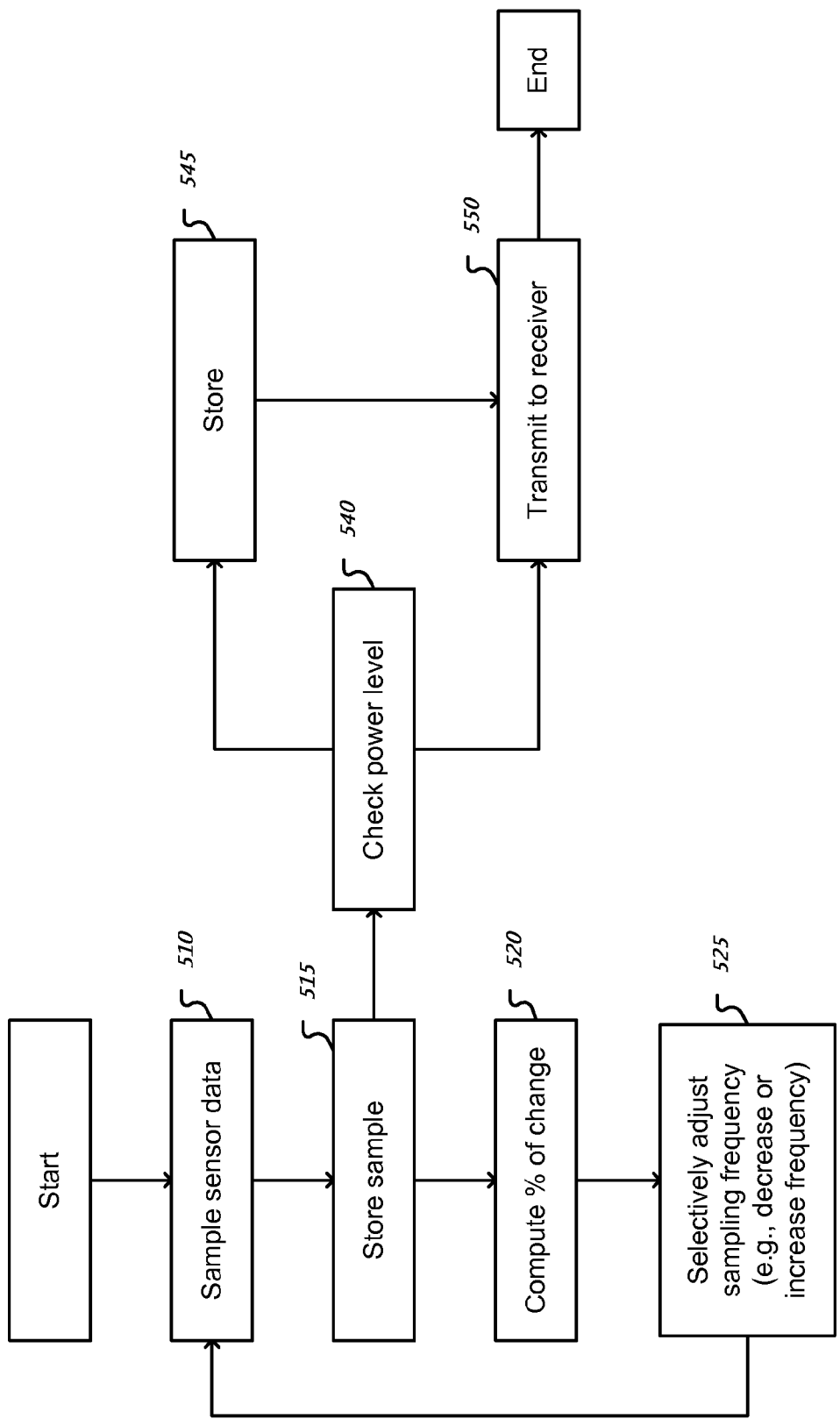
FIG. 5 shows an example of a control method that controls a wireless sensor based on a change of received sensor data and prior stored sensor data to optimize power consumption of the wireless sensor.

In some implementations, a wireless device can check to see if other Bluetooth enabled phones are in proximity and, if so, pair with one or more of these phones to begin a collaborative, distributed sampling process. For example, five mobile phones can collect measurement data amongst themselves (e.g., phone 1: sample at 10:01, phone 2: sample at 10:02, phone 3: sample at 10:03, phone 4: sample at 10:04, phone 5: sample at 10:05, phone 1: sample at 10:06, phone 2: sample at 10:07, phone 3: sample at 10:08, phone 4: sample at 10:09, phone 5: sample at 10:10). In such a collaborative, distributed arrangement, each phone may conserve energy by taking fewer samples, while a sensor system can provide measurements collected from each of the five phones. Also, this may eliminate redundancy in sensor data collection within a small area, such as the range of Bluetooth transceiver. FIG. 5 shows an example of a distributed sampling configuration.

FIG. 1A shows an example of a wireless sensor system architecture. The system can collect sensor data from one or more different sensors, such as a wireless sensor 110, via a mobile device 105, a mobile phone 120 with integrated sensor circuitry, or a wireless sensor 125. A base station 130, or a wireless access point, can communicate with devices such as mobile device 105, mobile phone 120, and wireless sensor 125 via a broadband wireless network. A wireless sensor 110 can use a short range radio protocol such as Bluetooth to transmit sensor data to a mobile device 105, which in turn, can forward sensor data over the broadband wireless network to the base station 140. A different wireless sensor 125 can operate a sensor and send sensor data over the broadband wireless network to the base station 140. The base station 140 can forward sensor data via network 135, e.g., the Internet. A network sensor server 140 can store and process data from the sensors 110, 120, 125. One or more application servers 150 can communicate with a network server 140 and can provide one or more functions and services that are based on sensor data. Further, a database server 145 can store sensor data.

Figure 1B:
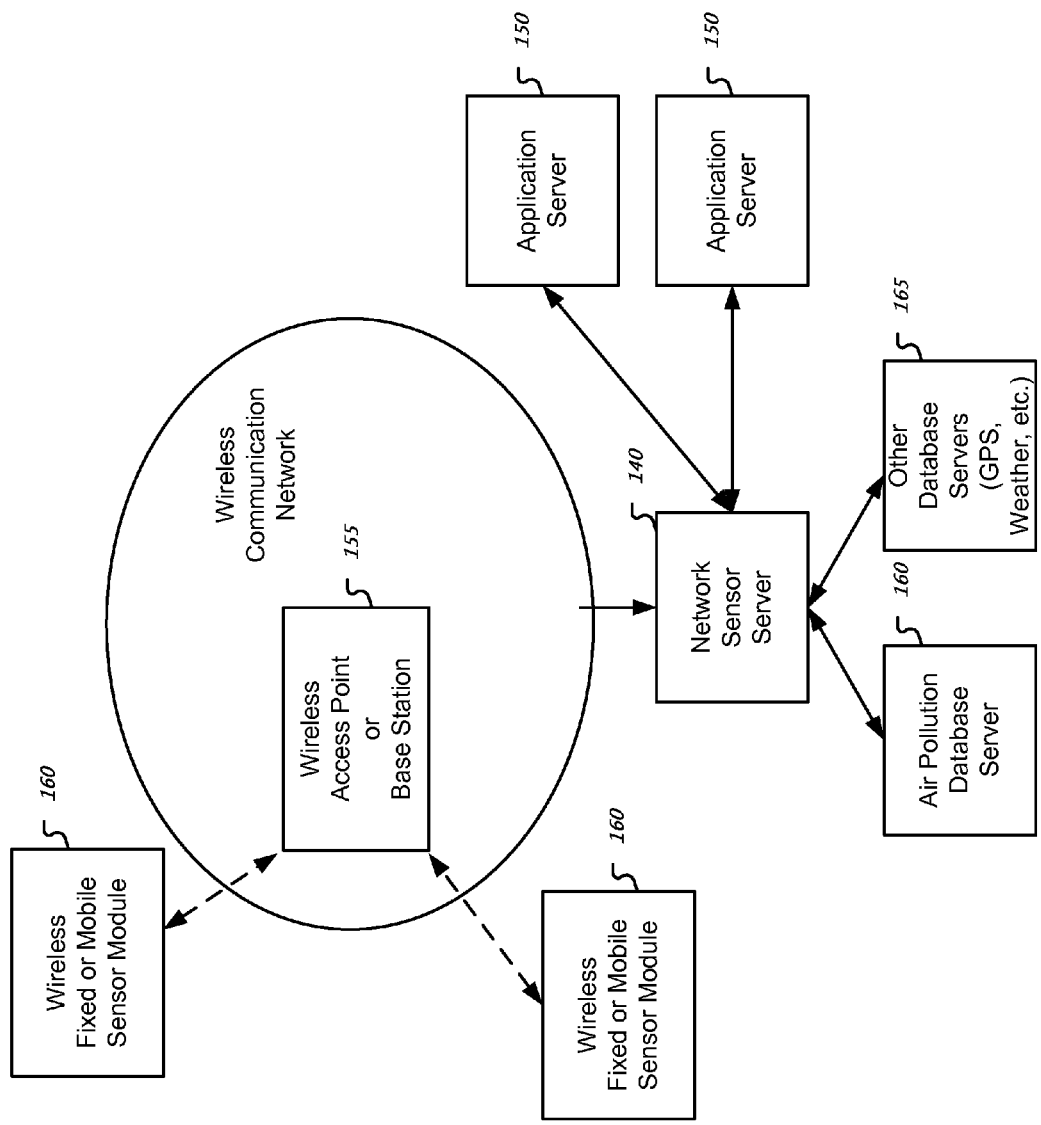
FIG. 1B shows an example of a wireless network designed to receive sensor data from one or more wireless fixed or mobile sensor modules to provide services based on the sensor data.

FIG. 1B shows an example of a wireless network designed to receive sensor data from one or more wireless fixed or mobile sensor modules to provide services based on the sensor data. A wireless communication network can include a network of wireless access points or base stations 155 that wirelessly communicate with wireless sensor modules 160. A wireless sensor module 160 can be fixed in position such as being attached to a roadside post, a traffic light, a building, a bridge or other such fixed structures. In some implementations, a wireless sensor module 160 can be a mobile device that is carried by a person or fixed to a motor vehicle, a boat, or other mobile object. The network can communicate with a mixture of wireless fixed or mobile sensor modules so that sensor data from such sensors are collected. The sensor data from each wireless sensor module 160 can be routed to a network sensor server 165 for storage and processing. A network sensor server 165 can communicate with the wireless network to receive the sensor data collected from one or more wireless sensors. Application servers 170 are provided to communicate with the network sensor server 165 and to provide various functions and services that are based on the sensor data or use the sensor data.

Database servers 175, 180 can be provided to supply data to the network sensor server 165 or application server 170. For example, one or more air pollution database servers 175 that store various air pollution data can be connected to supply data to the network sensor server 165. Other database servers 180, such as GPS, weather, population, municipal and other databases can communicate with the network sensor server 165. In operation, an application server 170 can use the sensor data and other data to conduct various analysis functions and monitoring functions. In some implementations, a server can combine the function of two or more servers 165, 170, 175, 180.

Figure 2:
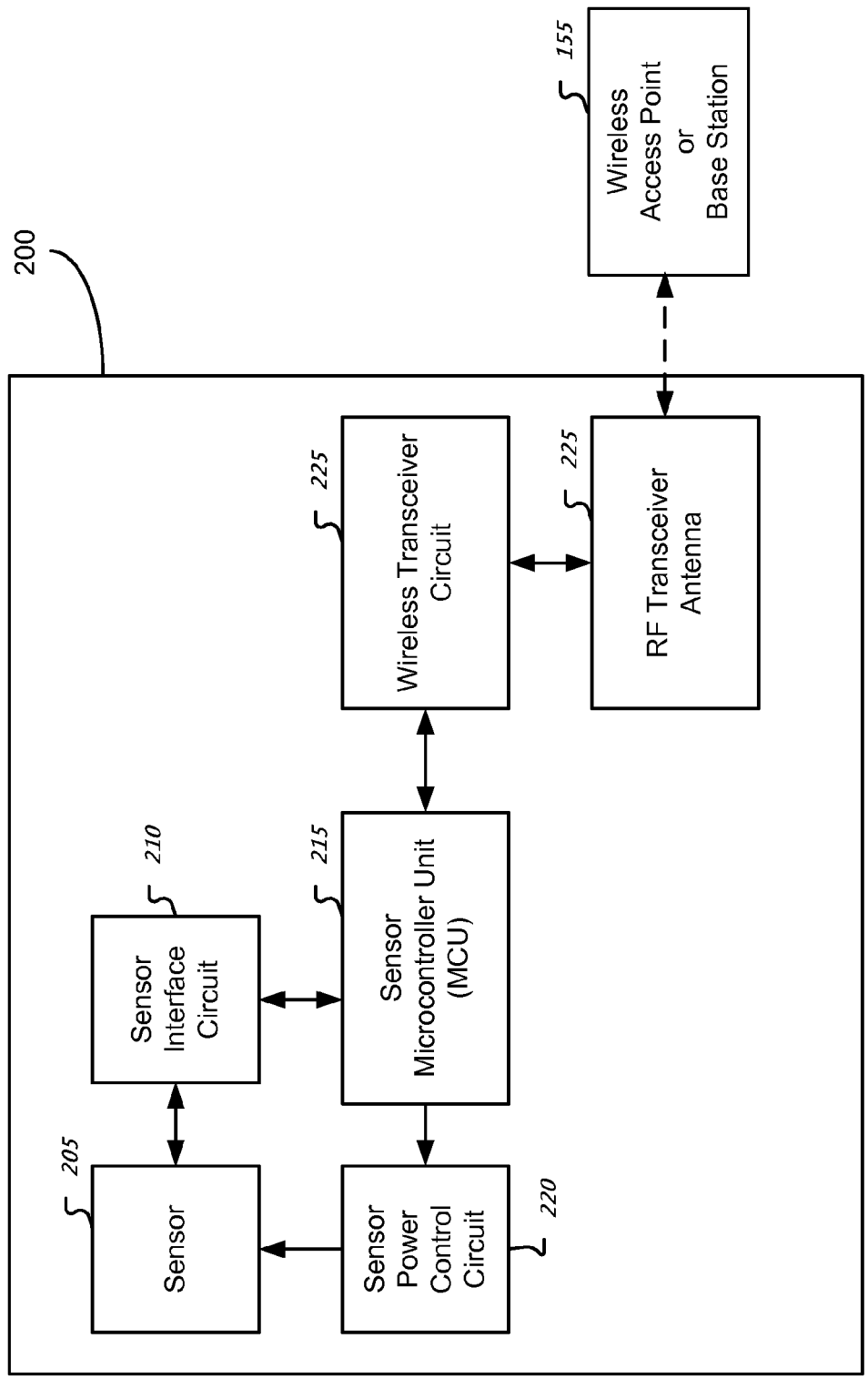
FIG. 2 shows an example of a wireless sensor module that wireless communicates with an access point or base station of a wireless network.
Figure 3:
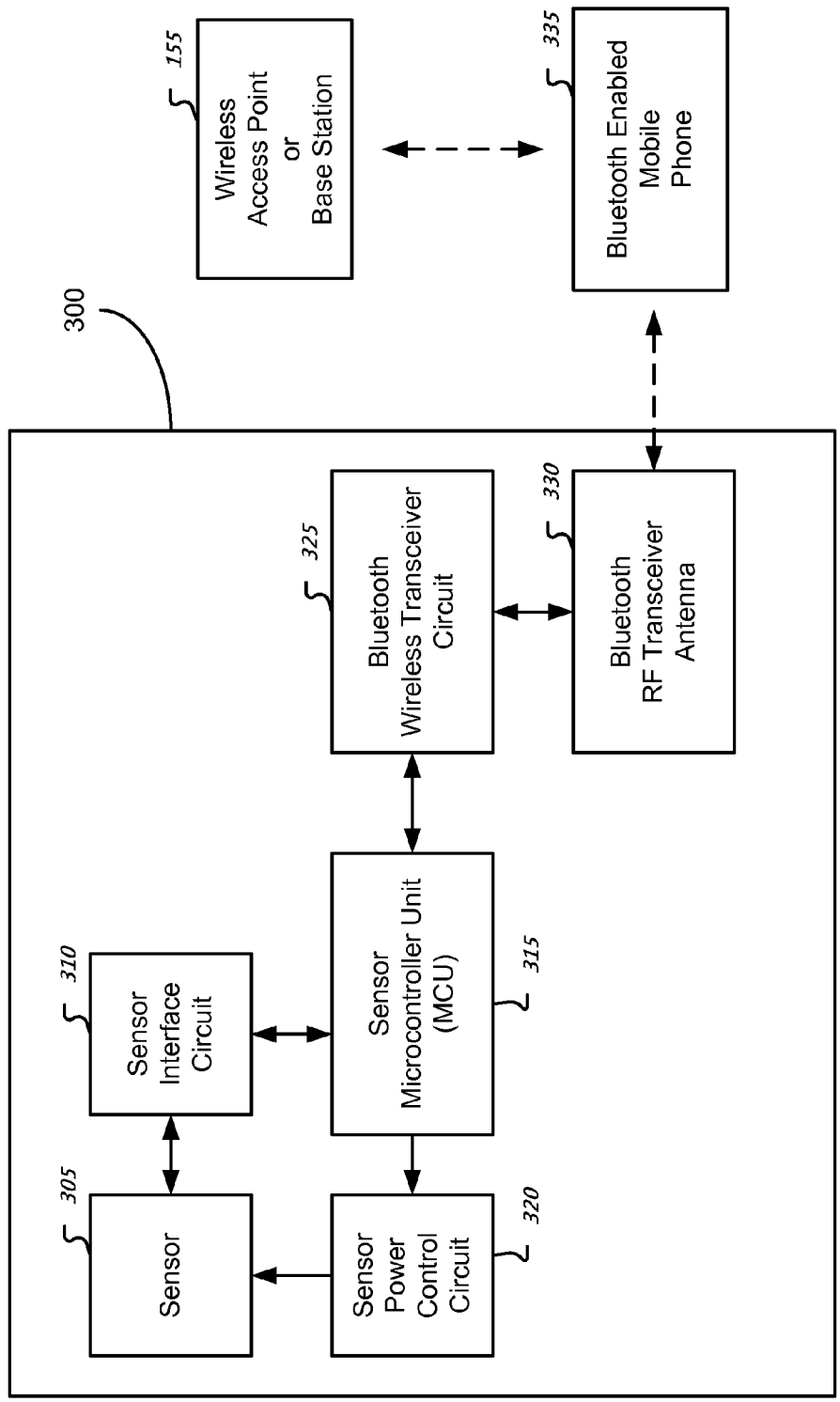
FIG. 3 shows an example of a wireless sensor module that wireless communicates with a wireless device to wirelessly transfer sensor data to the wireless device which in turn wirelessly transfers the sensor data to an access point or base station of a wireless network.
Figure 4:
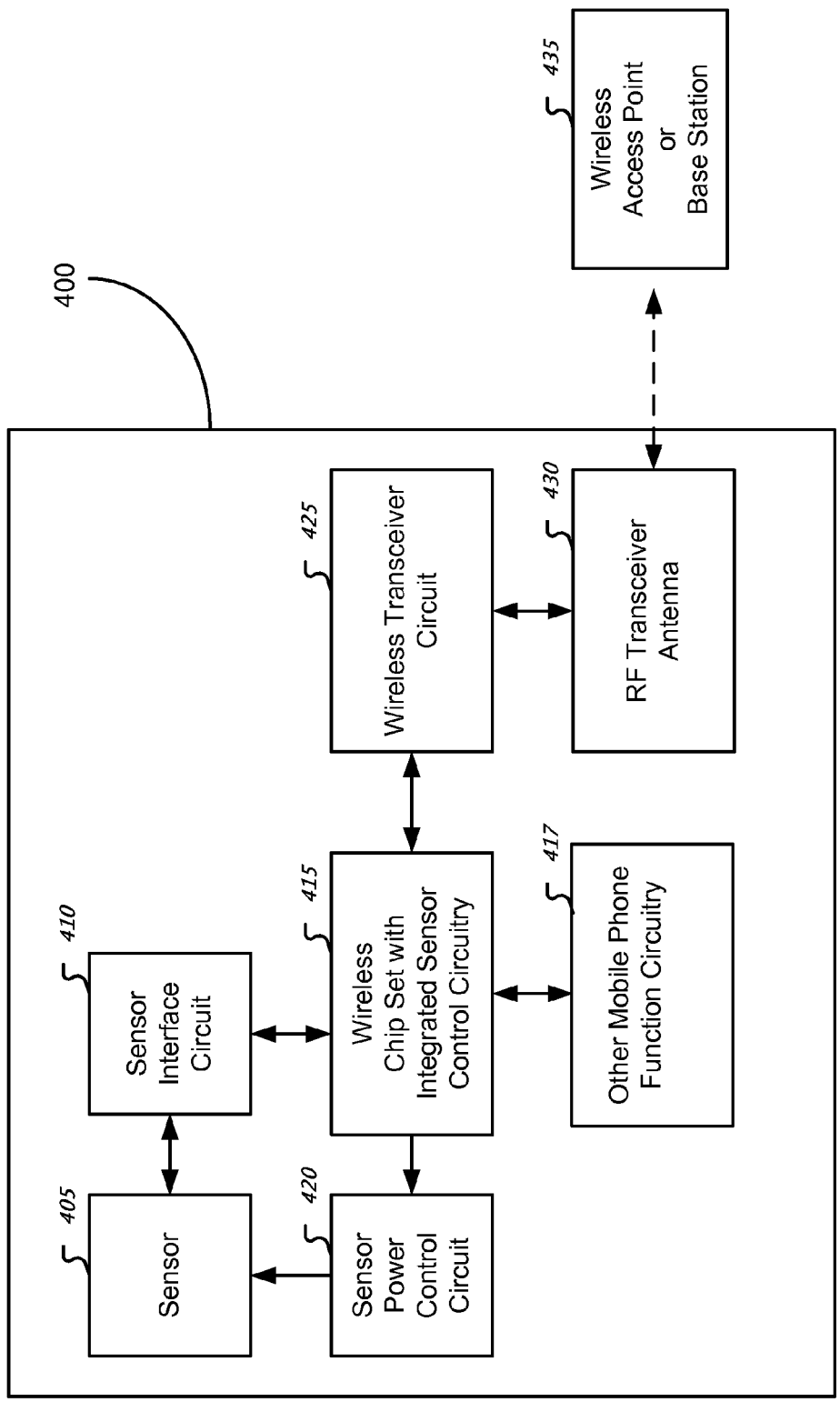
FIG. 4 shows a wireless device with an integrated sensor capability to wirelessly transfer sensor data to an access point or base station of a wireless network.

A wireless sensor module 160 can include a sensor, a controller such as a microcontroller, an RF transmitter, and an antenna. The sensor can take measurements and sends the measured data to the microcontroller for pre-processing. The RF transmitter can generate an RF transmission signal based on the pre-processed data from the microcontroller and transmits the pre-processed signal via antenna to one or more remote receivers. Examples of controllers include a microcontroller unit, a processor configured to operate a sensor, and a wireless or mobile phone chip set with integrated sensor control circuitry. FIGS. 2, 3 and 4 show different examples of wireless sensor modules and apparatuses.

A wireless sensor module or apparatus can include a microcontroller (MCU) to control one or more aspects of a sensor. For example, controllable parameters can include the sensor power and sampling frequency. Such parameters can enable intelligent monitoring to account for changes in the surrounding environment of the sensor unit or carrier, e.g., intelligently monitoring personal exposure to substances. The sensor unit or the carrier can be indoors or outdoors, and can travel through different locations. Enabling an intelligent sensor is important in a limited power supply situation where continuous samples without interpolation are needed, such as environmental monitoring. Through passive sampling by the sensor module, a sensor module can draw less power and can provide data towards modulating the sample frequency by calculating the percentage of change between new and stored samples towards the recognition of patterns. For example, if during passive sampling the sensor acquires the following data measured in parts per million (ppm): 004, 004, 004, 004, 056, this can cause the MCU to search previous entries for this data in this order, if not found, the sample frequency rate will be modified. If the entries are found, the MCU will not adjust the sample frequency rate assuming the spike is for "unimportant" reasons, such as noise.

FIG. 2 shows an example of a wireless sensor module that wirelessly communicates with an access point or base station of a wireless network. A wireless sensor module 200 can include a sensor 205, sensor interface circuit 210, sensor power control circuit 220, a sensor microcontroller unit 215, a wireless transceiver circuit 225, and a RF transceiver antenna 225. The wireless sensor module 200 can communicate with a base station 155. The wireless transceiver circuit 225 can use a wireless technology such as IS-95, CDMA2000 1x, EV-DO, Zigbee, UMB, GSM, WCDMA, HSPA (High-Speed Packet Access), LTE, WiMAX and WiFi for wireless communications.

FIG. 3 shows an example of a wireless sensor module that wirelessly communicates with a wireless device such as a mobile phone to wirelessly transfer sensor data to the wireless device, which in turn wirelessly transfers the sensor data to an access point or base station of a wireless network. A wireless sensor module 300 can include a sensor 305, sensor interface circuit 310, sensor power control circuit 320, a sensor microcontroller unit 315, a Bluetooth wireless transceiver circuit 325, and a Bluetooth RF transceiver antenna 330. Wireless sensor module 300 can communicate with a mobile phone 335 to transfer sensor data. The mobile phone 335 can forward sensor data via a base station 155.

In some implementations, a mobile phone 335 includes a first wireless communication card to wirelessly communicate with a wireless sensor module 300 to receive sensor data via a short range technology such as Bluetooth. The mobile phone 335 can include a second wireless communication card to communicate with base station 155 using a wireless technology such as IS-95, CDMA2000 1x, EV-DO, UMB, GSM, WCDMA, HSPA (High-Speed Packet Access), LTE, WiMAX, or WiFi. In some implementations, the wireless sensor module 300 can be a separate unit carried by a person or a clip-on unit that can be attached to a mobile phone.

FIG. 4 shows a wireless device with an integrated sensor capability to wirelessly transfer sensor data to an access point or base station of a wireless network. A wireless device 400 can include a sensor 405, sensor interface circuit 410, sensor power control circuit 420, wireless chip set 415, a wireless transceiver circuit 425, and a Bluetooth RF transceiver antenna 430. The wireless device 400 can forward sensor data via a base station 155. In some implementations, the wireless chip set 415 can include one or more of the sensor interface circuit 410, sensor power control circuit 420, and wireless transceiver circuit 425.

A wireless chip set 415 can include an integrated sensor control circuit or a sensor control logic to control the sensor power control unit 420 and/or the data collection from the sensor via a sensor interface circuit 410. A wireless chip set 415 can provide telephone and data operations and can interface with other mobile phone function circuitry 417 such as camera and audio circuitry, GPS receiver and circuitry, or a motion sensor. The wireless transceiver circuit 425 can be based on various wireless technologies such as IS-95, CDMA2000 1x, EV-DO, UMB, GSM, WCDMA, HSPA (High-Speed Packet Access), LTE, WiMAX, or WiFi.

In some implementations, a sensor module, including sensor 405, can be integrated within a separate circuit to eliminate redundancy of communications module and power. Sensor circuitry can be sized to a chip that hosts sensors and MCU with stored intelligence and samples. An example for this implementation is integration of the sensor within mobile devices, Bluetooth headsets, and vehicle computer systems so that the sensor is not a separate module.

In the above wireless sensor modules, power consumption of each sensor is an important technical consideration for practical deployment and commercialization. The sensor microcontroller or the integrated sensor control can be designed in a way that controls a sensor to regulate the frequency rate of samples collected by the sensor. In addition, the sensor microcontroller or the integrated sensor control can be designed to determine what to do with the collected sample data. This device has the ability to make informed decisions about data collection and handling based on knowledge of its environment and its power capacity enabling monitoring to be continuous, variable, and efficient.

FIG. 5 shows an example of a control method that controls a wireless sensor module based on a change of received sensor data and prior stored sensor data to optimize power consumption of the wireless sensor module. For example, the control method can reduce power consumption of the sensor by lowering a sampling frequency rate if sampled sensor data becomes uninteresting, or exhibits minor or no variations between samples. On the other hand, the control method can increase a sampling frequency rate if sampled sensor data becomes interesting and/or exhibits variations, above a threshold value, between samples. The control method can sample 510 sensor data, can store 515 the sample, and can compute 520 a percent change between the current sample and a previous sample. The method can selectively adjust 525 the sampling frequency, e.g., decrease or increase frequency. The method can check 540 a power level of a power source providing power to the sensor and/or sensor module. The method can store 545 the sample for future transmission or retrieval. The method can transmit the sample 550 to a receiver.

In some implementations, regulation of the sample frequency rate is determined by the percentage of change in the values of stored and collected data sets. This method enables judgment of data to be based on its percent of change not its value—making it so that diverse data can be collected and patterns can be recognized. The determination of either storing or transmitting the collected sample data can be based on a system for monitoring the power level.

Such a "smart" mobile monitoring unit may allow a geo-time specific quantification of personal exposure to that which is being monitored at a ground-level, which can be seen in both real-time and over time with data that has been archived. The results of an ethnographic study done on a student during the hours of 9 AM to 12 PM yielded 18 changes in their environment. These changes in environment included being in an apartment with open windows, to walking outside, driving in a car with the windows down and up, with the air conditioning (ac) on, running within the campus, sitting near a smoker, walking to the bus on a busy street, standing on a busy street, riding the bus with windows open, walking past and standing near construction sites, etc. Each of these changes in the environment necessitate a particular way to collect data. Once data is received it is stored and/or transmitted to a receiver. The power control for the sensor is designed with intelligence to make decisions based on its environment to optimize its power consumption.

Figure 6:
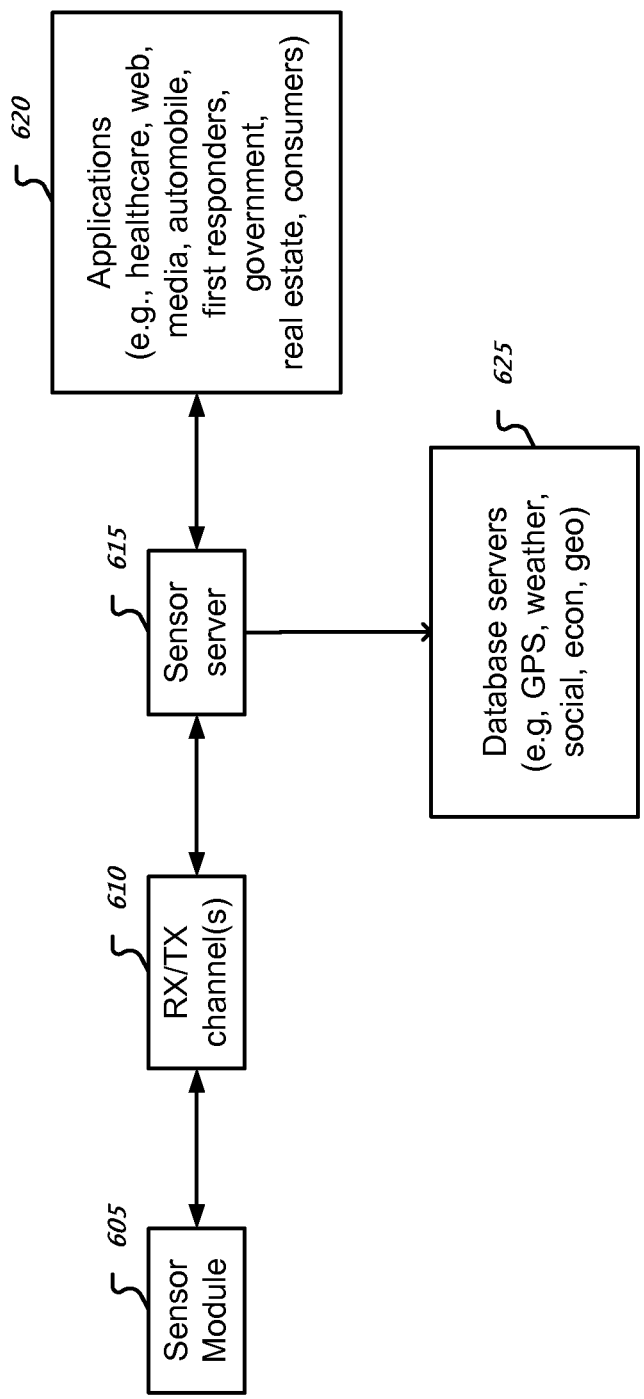
FIG. 6 shows an example of a wireless sensor module and a wireless network for providing a range of services and functions based on sensor data from one or more wireless sensor modules.

FIG. 6 shows an example of a wireless sensor module and a wireless network for providing a range of services and functions based on sensor data from the wireless sensor module and other wireless sensor modules. To enable these services, a sensor server 615 directs flows of sensor data, such as samples collected by a sensor module 605, to various application servers 620 as indicated by the arrowed lines in FIG. 6. The sensor data is transmitted through one or more RX/TX channels 610, e.g., a Bluetooth, a mobile phone network or other wireless network, and a computer network such as the Internet to various storage facilities such as MCU, phone, or database. Data transmission can be bi-directional between a storage device and a sensor to enable proper storage and management of the sensor and also for use as a parameter to determine control, testing and debugging. For example, the sensor server 615 can include a script that asks a database server 625 for the average readings transmitted from all devices within a particular geographic region. If the average readings of a sensor parameter are high, the server can pass a message to a mobile phone, in communication with the sensor, enabling a script that alerts a user to the high averages and asks permission to set the sample frequency associated with the sensor according to the collected data stored on the database server 625. The average readings can also be used to control the sample frequency rate of the sensor.

The arrows in FIG. 6 are also indicators of the space where synchronization can occur. Displaying real-time and continuous data without any loss of samples due to certain events may require synchronization between two or more of the elements shown in FIG. 6. Environmental monitoring for emergency situations is one example where the real-time accurate data is crucial. When data is transmitted and then received by the device such as a mobile phone or a server, the software to visualize the data can execute a listening script for the posting of the data. The listening script can execute on the front-end application layer in a variable frequency loop to coordinate data posting with data acquisition. This synchronization between the sensor module 605 and the device running the listening script may be desirable because the sample frequency rate of the sensor module 605 and the listening frequency rate of the device may not be coordinated.

The synchronization between the sensor module and the application may not be possible in some cases such as when a variable sample rate is executed through intelligence. When this occurs, a timing control mechanism or process, such as the one depicted in FIG. 7, can be provided to control the data storage and re-transmission of the data.

Figure 7:
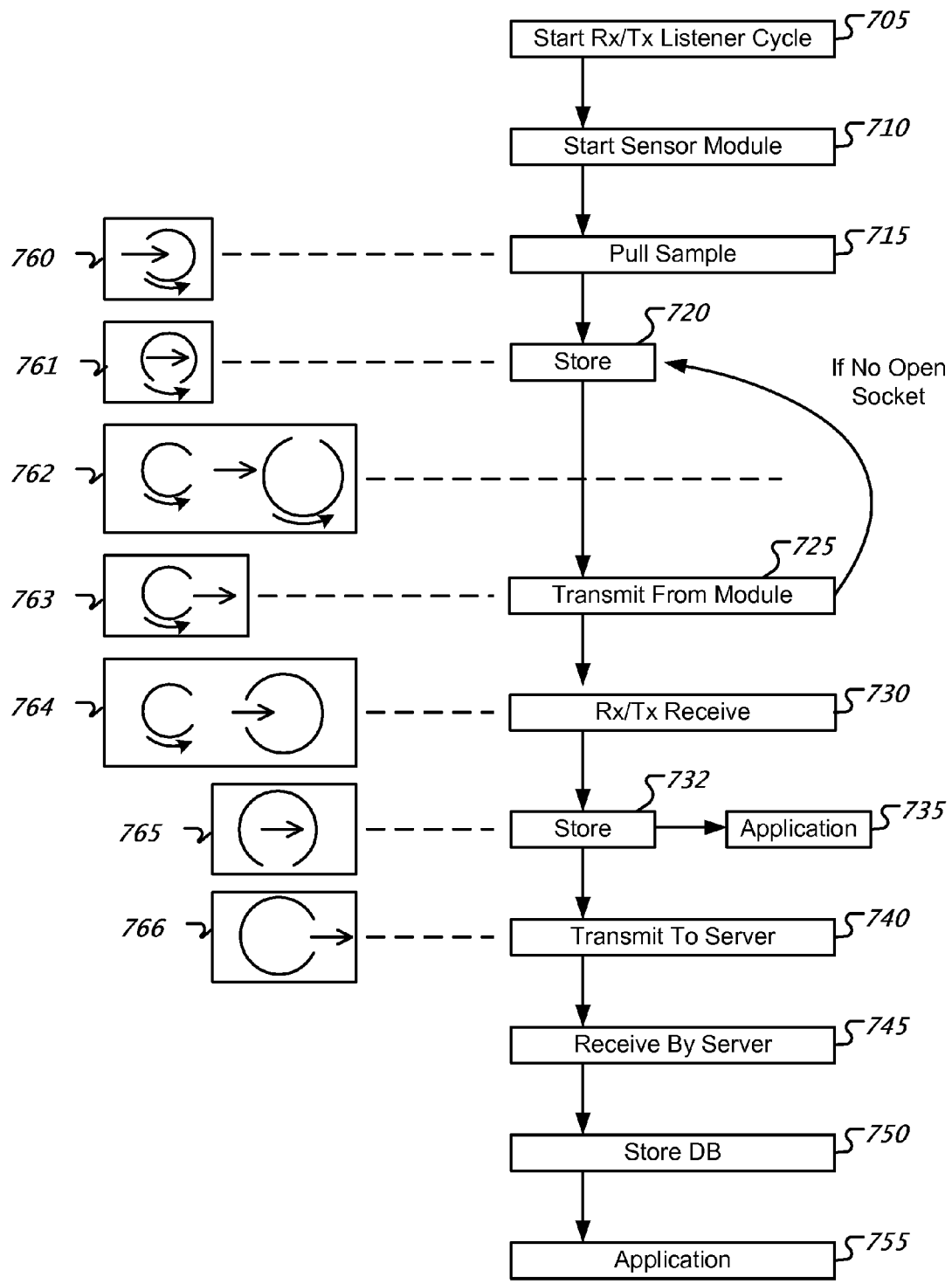
FIG. 7 shows an example of a timing control technique.

FIG. 7 shows an example of timing control technique. The can technique can include a timing process to coordinate sensor data gathering and storage between multiple components of a sensor system. The process can include multiple processes located in different components of the sensor system. The process can start 705 a RX/TX listener cycle and can start 710 a sensor module. A sample can be pulled 715 from the sensor module and can be stored 720. The sensor module can transmit 725 the sensor samples. If there are no open sockets, the sample can remain in storage. A RX/TX receive process can receive 730 the data generated by the sensor module, and decide to store 732 the sensor data and/or forwarded it to an application 735 and/or transmit 740 the sensor data to a server. The server can receive 745 the data and decide to store 750 the data in a database such can be used by an application 755. The synchronization boxes 760, 761, 762, 763, 764, 765, 766 represent different synchronization processes.

Figure 8:
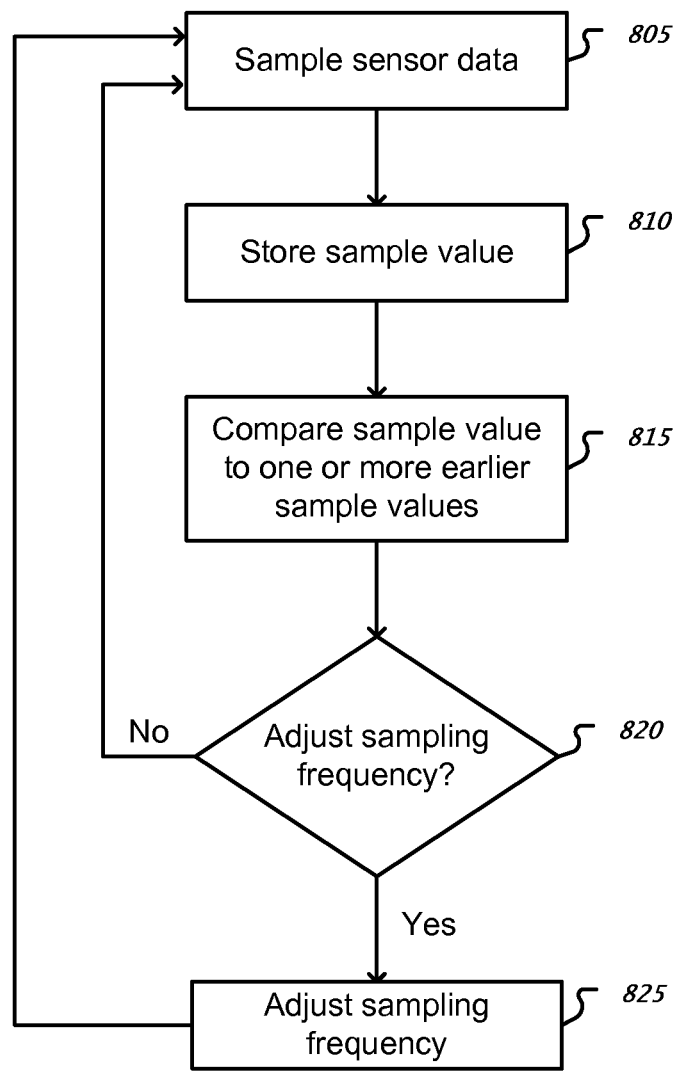
FIG. 8 shows an example of adjusting a sampling frequency.

FIG. 8 shows an example of adjusting a sampling frequency. A sensor module periodically samples data from a sensor at a sampling frequency. The sampling frequency can be adjusted to meet operational requirements. The sensor module can sample 805 sensor data to obtain a sample value, and can store 810 the sample value. The module can compare 815 the collected sample value with one or more previous sample values. An output of the comparison 815 can be analyzed to determine 820 whether or not to adjust the sampling frequency. If no adjustment is required, the module continues to collect 805 sensor sample data at the current sampling frequency. If an adjustment is required, the sampling frequency can be adjusted 825 and the module can sample 805 sensor data using the adjusted sampling frequency.

In some implementations, if the percent change between a previous sample value and a current sample value exceeds a threshold value, the sampling frequency can be adjusted. For example, a percent increase that surpasses a threshold can trigger an increase to the sampling frequency. On the other hand, a percent decrease can trigger a decrease to the sampling frequency. The change in the sampling frequency can be linear or non-linear.

Figure 9:
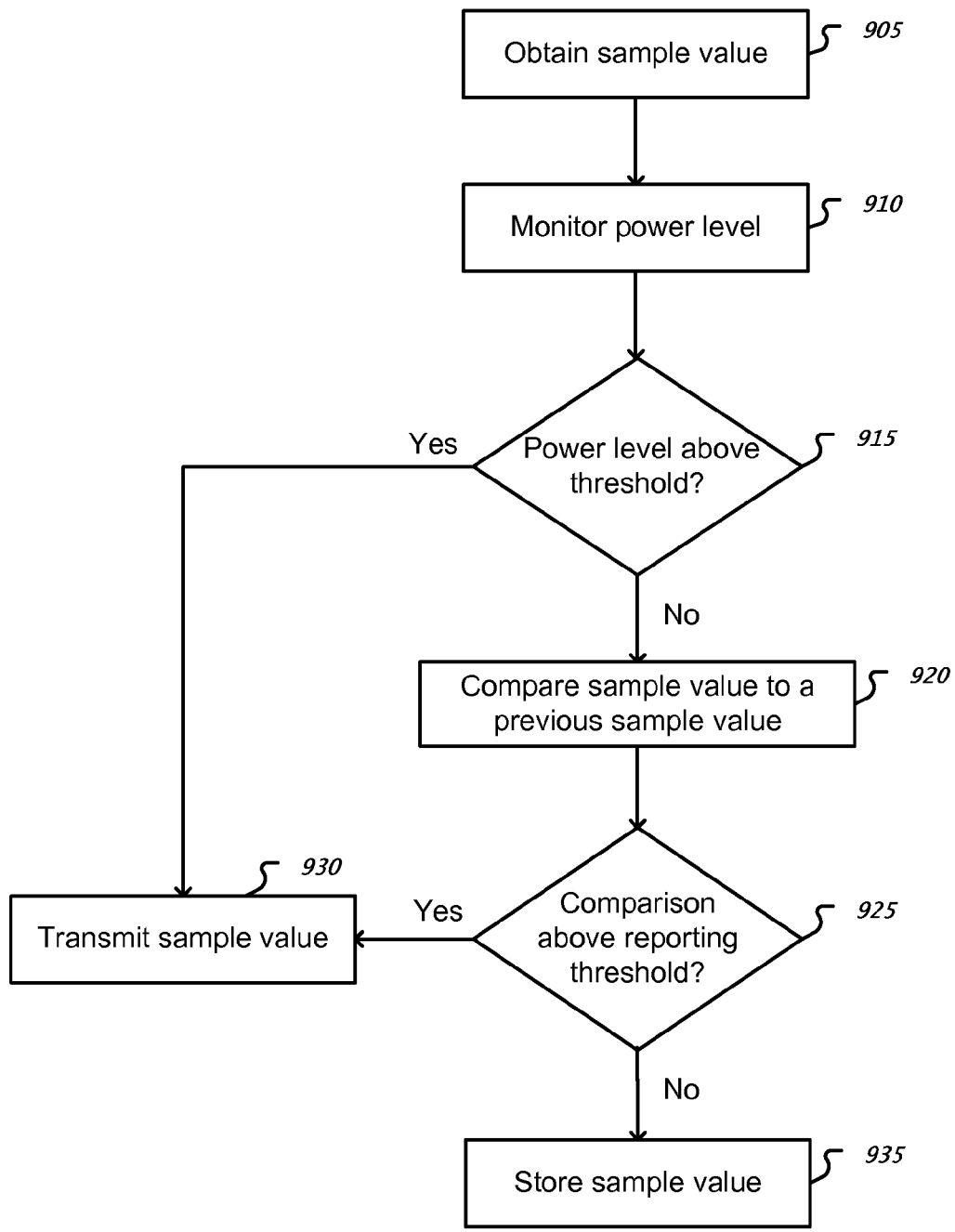
FIG. 9 shows an example of selectively transmitting sample data.

FIG. 9 shows an example of selectively transmitting sample data. A technique can include obtaining 905 a sample value from a sensor, e.g., sampling 805 sensor data, and monitoring 910 a power level to make a transmission decision. In some implementations, the power level corresponds to a battery that powers the sensor module. If the power level is above 915 a threshold value, the technique can transmit 930 the sample data. If the power level is not above 915 a threshold value, the technique can compare 920 the sample value to a previous sample value. If the comparison indicates 925 that a reporting threshold value is exceeded, then the technique can transmit 930 the sample data. Otherwise, the technique can store 935 the sample value for future use or transmission.

In some implementations, a selective transmission technique includes determining whether to transmit based on a comparison between a power level of the sensor module and a power level threshold value. In some implementations, the technique includes overriding the determination, based on a comparison between a sample comparison, e.g., a percent change between sample vales, and a reporting threshold value, to transmit the sample data.

Figure 10:
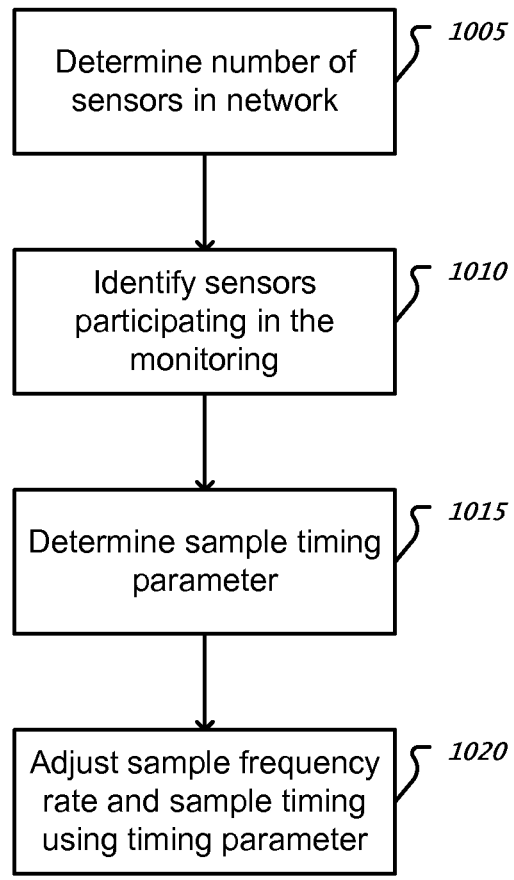
FIG. 10 shows an example process flow for adjusting timing based on distributed monitoring.

FIG. 10 shows an example process flow for adjusting timing based on distributed monitoring. A sensor network can include one or more sensors that are within communication range of one another and, e.g., a device to which sensor data can be transmitted. Further, in order to conserve power and prevent redundant sampling, the sample timing of sensors included in the sensor network can be coordinated. For instance, each participating sensor can be configured to take samples at a reduced sampling rate and the sampling times for all of the sensors can be coordinated. As a result, the resolution of samples taken in the network can be maintained, while the activity of each of the sensors in the network can be reduced.

In order to coordinate the activity of sensors, the number of sensors in the network can be determined (1005). In some implementations, the number of sensors can be determined actively, such as through polling or other such communication. In some other implementations, the number of sensors can be determined passively, e.g., based on a sensor plan or sensor map. Also, the sensors participating in the monitoring can be identified (1010). For instance, only sensors configured to sample for a particular condition or substance, e.g. CO, can be identified as participating. Based on the participating sensors, a common sample timing parameter can be determined (1015). The sampling resolution can be determined based on the application. For instance, some applications can require a resolution measured in milliseconds, while other applications can require a resolution measured in minutes or hours. A common sample timing parameter can be established based on the number of participating sensors, so that the sampling resolution is maintained. For instance, if five sensors are participating and the sampling resolution is one second, the sample timing parameter can be set to five seconds. As a result, each of the five sensors will take a sample every five seconds, but the sampling resolution of one second will be maintained.

Once the sample timing parameter has been determined, the sampling frequency rate and sample timing can be adjusted (1020). For instance, in accordance with the example above, the sampling frequency rate of each sensor can be set to five seconds. Further, the sample timing can be set such that the operation of the sensors is coordinated and the samples are taken one second apart. The sampling network can then operate as configured until a change is required.

Figure 11A:
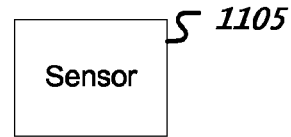
FIGS. 11A-C show an example of a distributed monitoring configuration adapted to conserve power while maintaining a high resolution level of data passed to the server.
Figure 11B:
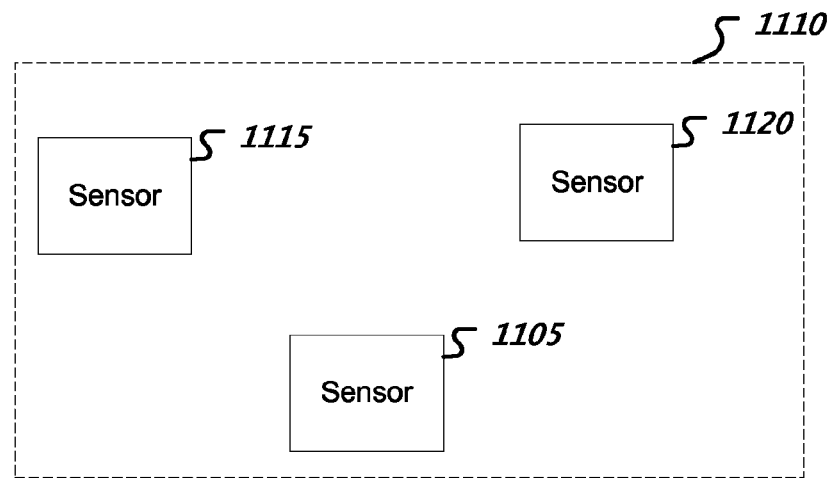
Figure 11C:
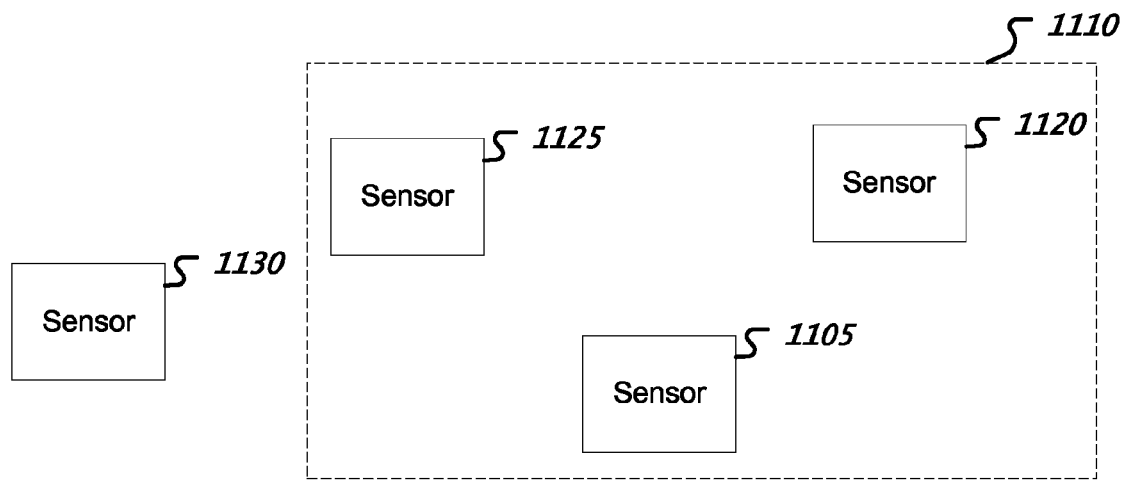

FIGS. 11A-C show an example of a distributed monitoring configuration adapted to conserve power while maintaining a high resolution of the data passed to the server. In FIG. 11A, a single sensor 1105 is configured to monitor a parameter at a sampling resolution of 10 milliseconds. That is, every 10 milliseconds, the sensor 1105 takes a sample. In FIG. 11B, the sensor 1105 is shown as part of sensor network 1110, which also includes sensor 1115 and sensor 1120. Further, it can be determined that sensor 1105 and sensor 1120 are both adapted to monitor the same parameter, while sensor 1115 is adapted to monitor one or more different parameters. Accordingly, a common sample timing parameter can be determined for sensors 1105 and 1120, which maintains the sampling resolution of 10 milliseconds but distributes the workload across the participating sensors 1105 and 1120. For instance, the sample timing parameter can be set to 20 milliseconds, such that sensors 1105 and 1120 each take a sample every 20 milliseconds. Further, the sample timing of sensors 1105 and 1120 can be coordinated, such that they take their samples 10 milliseconds apart. As a result, the original sampling resolution of 10 milliseconds can be maintained.

Further, in FIG. 11C, sensor 1115 can be replaced by sensor 1125, which also monitors the same parameter as sensors 1105 and 1120. Also, it can be determined that sensor 1130 lies outside of sensor network 1110 and thus can be ignored for purposes of determining a common sample timing parameter. Since sensors 1105, 1120, and 1125 each monitor the same parameter, the sample timing parameter can be set to 30 milliseconds. Thus, each of sensors 1105, 1120, and 1125 takes one sample every 30 milliseconds. Further, the sample timing of sensors 1105, 1120, and 1125 can be coordinated, such that each sample is taken 10 milliseconds apart. As a result, the original sampling resolution of 10 milliseconds can be maintained.

In some implementations of the subject described herein, a wireless sensor device can include a sensor that responds to one or more target substances to produce a measurement; a power control unit electrically coupled to the sensor to supply and regulate electrical power to the sensor; and a sensor microcontroller in communication with and to control operations of the sensor and the power control unit. The sensor microcontroller is configured to include at least one internal memory unit to store received measurement data from the sensor and to determine a change of incoming measurement data in comparison to stored measurement data. The sensor microcontroller is configured to control the sensor to adjust a sampling rate of the sensor based on the determined change of incoming measurement data in comparison to stored measurement data. This device also includes a wireless transmitter in communication with the sensor microcontroller to wirelessly transmit measurement data out of the sensor module in response to a control by the sensor microcontroller.

In another implementation, a wireless sensor device can include a sensor that responds to one or more target substances to produce a measurement; a sensor power control unit electrically coupled to the sensor to supply and regulate electrical power to the sensor; a sensor microcontroller in communication with and to control operations of the sensor and the sensor power control unit; and a sensor wireless transmitter in communication with the sensor microcontroller to wirelessly transfer measurement data out of the sensor module, in response to a control by the sensor microcontroller, to a wireless digital communication device which also wirelessly communicates with a wireless network so that the measurement data is first wirelessly transferred to the wireless digital communication device which in turn wirelessly transfers the measurement data to the wireless network.

In another implementation, a wireless sensor device can include a sensor that responds to one or more target substances to produce a measurement; a sensor power control unit electrically coupled to the sensor to supply and regulate electrical power to the sensor; and a wireless chip set configured to directly wirelessly communicate with an access point or base station of a wireless network based on a wireless technology selected from IS-95, CDMA2000 1x, EV-DO, Zigbee, UMB, GSM, WCDMA, HSPA (High-Speed Packet Access), LTE, WiMAX and WiFi wireless technologies. The wireless chip set includes an integrated sensor controller in communication with and to control operations of the sensor and the sensor power control unit and to receive measurement data from the sensor and to include measurement data as part of data wirelessly transmitted to the wireless network. This device also includes a wireless transceiver in communication with and under control of the wireless chip set to wirelessly to wirelessly communicate with the wireless network and to transfer the measurement data from the sensor to the wireless network.

The disclosed and other embodiments and the functional operations described in this patent application can be implemented in digital electronic circuitry, or in computer software, firmware, or hardware, including the structures disclosed in this patent application and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this patent application can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent application contains many specifics, these should not be construed as limitations on the scope of an invention that is claimed or of what may be claimed, but rather as descriptions of features specific to particular embodiments. Certain features that are described in this patent application in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   operating a sensor to respond to one or more target environmental inputs to produce sensor data;
   sampling the sensor data to produce sample values;
   comparing two or more of the sample values;
   monitoring a power supply to ascertain a power level; and
   selectively transmitting measurement data to a server via one or more wireless communication channels based on the power level and the sample value comparison, wherein the measurement data comprises one or more of the sample values.

2. The method of claim 1, wherein selectively transmitting measurement data comprises determining whether to transmit based on a comparison between the power level and a power level threshold value.

3. The method of claim 2, wherein selectively transmitting measurement data comprises overriding a determination to transmit the measurement data based on a comparison between the sample value comparison and a reporting threshold value.

4. The method of claim 1, further comprising:
   selectively adjusting a sampling frequency based on the sample value comparison, wherein sampling the sensor to produce sample values comprises sampling data from the sensor at the sampling frequency.

5. The method of claim 4, wherein selectively adjusting the sampling frequency comprises increasing the sampling frequency based on the sample comparison.

6. The method of claim 4, wherein performing the sample value comparison comprises computing a percent change between a current sample value and a previous sample value from the sensor.

7. The method of claim 1, wherein selectively transmitting measurement data comprises transmitting the measurement data to a wireless device over a first wireless channel, wherein the wireless device forwards the measurement data to the server over a second wireless channel.

8. The method of claim 7, wherein transmitting the measurement data to the wireless device comprises transmitting the measurement data over a Bluetooth communication channel.

9. The method of claim 1, wherein selectively transmitting measurement data comprises transmitting the measurement data to the server via a broadband wireless network.

10. A method for using wireless sensors in a wireless communication network, comprising:
    operating a sensor to respond to one or more target substances to produce a measurement;
    operating a power control unit that is electrically coupled to the sensor to supply and regulate electrical power to the sensor;
    measuring a change in measurement data output from the sensor;
    controlling the sensor to adjust a sampling rate based on the measured change in the measurement data; and
    operating a wireless transmitter to transmit measurement data to a wireless receiver.

11. The method of claim 10, wherein the wireless transmitter comprises a Bluetooth transmitter.

12. An apparatus, comprising:
    a sensor adapted to respond to one or more target environmental inputs to produce sensor data;
    a power control unit electrically coupled to the sensor to supply and regulate electrical power to the sensor;
    a controller in communication with and configured to control operations of the sensor and the power control unit, wherein the controller is configured to sample the sensor data to produce sample values, perform a sample comparison among two or more of the sample values, monitor the power control unit to ascertain a power level, and selectively control a transmission of measurement data based on the power level and the sample comparison, wherein the measurement data comprises one or more of the sample values; and
    a wireless transmitter in communication with the controller to wirelessly transmit the measurement data to a server in response to an output of the controller, wherein the server is configured to collect sensor data.

13. The apparatus of claim 12, wherein the wireless transmitter communicates with the server via a broadband wireless network.

14. The apparatus of claim 12, wherein the controller comprises a sensor microcontroller configured to include at least one internal memory unit to store the sample values, the sensor microcontroller further configured to control the sensor and to adjust a sampling frequency of the sensor based on the sample comparison.

15. The apparatus of claim 14, further comprising:
    a portable power source connected to the power control unit which directs electrical power from the portable power source to the sensor and regulates the electrical power in response to a control by the sensor microcontroller, wherein the portable power source comprises a battery.

16. The apparatus of claim 12, wherein the wireless transmitter is configured to wirelessly communicate with a mobile telephone, which wirelessly communicates with a wireless network, so that the measurement data is first wirelessly transferred to the wireless digital communication device, which in turn wirelessly transfers the measurement data to the wireless network.

17. The apparatus of claim 12, wherein the controller is further configured to selectively adjust a sampling frequency based on the sample comparison, wherein sampling the sensor to produce sample values comprises sampling data from the sensor at the sampling frequency.

18. The apparatus of claim 17, wherein selectively adjusting the sampling frequency comprises increasing the sampling frequency in response to the detected change.

19. The apparatus of claim 17, wherein performing the sample comparison comprises computing a percent change between a current sample value and a previous sample value from the sensor.

20. A system comprising:
    a server configured to receive sensor data; and
    a wireless device in communication with the server via a wireless network, wherein a sensor module is integrated into the wireless device, the sensor module being configured to:
    operate a sensor to respond to one or more target environmental inputs to produce sensor data;
    sample the sensor data to produce sample values;
    perform a sample comparison among two or more of the sample values;
    monitor a power supply to ascertain a power level, and
    selectively transmit measurement data to a server via one or more wireless communication channels based on the power level and the sample comparison;
    wherein the measurement data comprises one or more of the sample values.

21. The system of claim 20, further comprising:
selectively adjusting a sampling frequency based on the sample comparison.

22. The system of claim 21, wherein performing the sample comparison comprises computing a percent change between a current value and a previous value from the sensor.

23. A method comprising:
determining a number of sensors within an operative wireless communication range, wherein each of the sensors is configured to monitor a predetermined parameter;
identifying a sampling resolution specifying an interval at which sample data corresponding to the predetermined parameter is to be captured;
computing a sampling rate that specifies an interval at which each of the sensors will capture sample data;
determining a sampling order that establishes a sequence in which the sensors will capture sample data; and
configuring the sensors to capture sample data in accordance with the sampling rate and the sampling order, and to wirelessly transmit captured sample data.

* * * * *